US011150865B2

(12) United States Patent
Quirino et al.

(10) Patent No.: US 11,150,865 B2
(45) Date of Patent: Oct. 19, 2021

(54) SYSTEMS AND METHODS TO OPTIMIZE MUSIC PLAY IN A SCROLLING NEWS FEED

(71) Applicant: Facebook, Inc., Menlo Park, CA (US)

(72) Inventors: Timothy Matthew Quirino, San Francisco, CA (US); Michael Luis Cerda, Alamo, CA (US); Holly Marie Ormseth, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/509,144

(22) Filed: Jul. 11, 2019

(65) Prior Publication Data

US 2019/0391786 A1 Dec. 26, 2019

Related U.S. Application Data

(63) Continuation of application No. 14/977,577, filed on Dec. 21, 2015, now Pat. No. 10,372,410.

(51) Int. Cl.
*H04N 21/472* (2011.01)
*G06F 3/16* (2006.01)
(Continued)

(52) U.S. Cl.
CPC ............ *G06F 3/165* (2013.01); *G06F 3/0482* (2013.01); *G06F 3/0485* (2013.01); *G06F 3/04817* (2013.01); *G06F 3/04883* (2013.01); *H04N 21/4355* (2013.01); *H04N 21/4788* (2013.01); *H04N 21/47217* (2013.01); *H04N 21/8113* (2013.01)

(58) Field of Classification Search
CPC combination set(s) only.
See application file for complete search history.

(56) References Cited

U.S. PATENT DOCUMENTS 9,390,447 B1 * 7/2016 Smith ................ G06Q 30/0631
9,395,904 B2 7/2016 Malik et al.
(Continued)

OTHER PUBLICATIONS

Create a rotation animation for album artwork in Swift by Diep Nguyen. Published Aug. 29, 2015. Web download at https://www.codentrick.com (Year: 2015). 8 pages.*
(Continued)

*Primary Examiner* — Hien L Duong
(74) *Attorney, Agent, or Firm* — Sheppard Mullin Richter & Hampton LLP

(57) ABSTRACT

Systems, methods, and non-transitory computer readable media are configured to receive metadata for audio content associated with an audio content item for presentation in a news feed to be displayed on a screen of a computing device associated with a user. The metadata is transformed for display in the audio content item. The transformed metadata is displayed in the audio content item. In addition, systems, methods, and non-transitory computer readable media are configured to present an audio content item in a news feed to be displayed on a screen of a computing device associated with a user. An input by the user for scrolling the news feed and the audio content item on the screen is received. A pop out player is presented in response to disappearance of the audio content item from the screen based on the scrolling.

20 Claims, 9 Drawing Sheets

(51) Int. Cl.
*G06F 3/0488* (2013.01)
*G06F 3/0485* (2013.01)
*H04N 21/4788* (2011.01)
*H04N 21/81* (2011.01)
*G06F 3/0482* (2013.01)
*H04N 21/435* (2011.01)
*G06F 3/0481* (2013.01)

(56) References Cited

U.S. PATENT DOCUMENTS

| | | |
|---|---|---|
| 9,426,519 B1 | 8/2016 | Lewis et al. |
| 9,588,647 B1 | 3/2017 | Lewis et al. |
| 9,602,757 B2 | 3/2017 | Chaudhri |
| 9,794,643 B2 | 10/2017 | Lewis et al. |
| 2009/0049385 A1 | 2/2009 | Blinnikka et al. |
| 2009/0122018 A1 | 5/2009 | Vymenets et al. |
| 2010/0073380 A1 | 3/2010 | Kaplan et al. |
| 2010/0325549 A1 | 12/2010 | Gibson et al. |
| 2010/0328224 A1 | 12/2010 | Kerr et al. |
| 2011/0283236 A1* | 11/2011 | Beaumier ............ G06F 3/0482 715/835 |
| 2012/0290931 A1* | 11/2012 | Nurmi .................. G11B 27/34 715/716 |
| 2013/0047119 A1* | 2/2013 | Lee ...................... G06F 3/0481 715/800 |
| 2015/0062052 A1* | 3/2015 | Bernstein ............. G06F 3/0416 345/173 |
| 2015/0205511 A1* | 7/2015 | Vinna .................. G06F 3/0481 715/716 |
| 2015/0220264 A1 | 8/2015 | Lewis et al. |
| 2016/0011850 A1 | 1/2016 | Sheen et al. |
| 2016/0035323 A1* | 2/2016 | Na ...................... G06F 3/04883 715/716 |
| 2016/0066114 A1* | 3/2016 | Skovenborg ......... H03G 3/3005 381/56 |
| 2016/0103589 A1* | 4/2016 | Dziuk .................... G06F 3/165 715/716 |

OTHER PUBLICATIONS

Marshall, Jack, "Sticky Videos' Help Online Publishers Boost Video Ad Viewability" Wall Street Journal, Dec. 14, 2015 (Year: 2015), 2 pages.

"The Washington Post Launches New Video Player for Continuous Viewing While Reading", by WashPostPR, The Washington Post, Dec. 11, 2015 (Year: 2015), 2 pages.

* cited by examiner

500

```
┌─────────────────────────────────────────────────────────────────┐
│ Receive metadata for audio content associated with an audio     │
│ content item for presentation in a news feed to be displayed    │
│ on a screen of a computing device associated with a user        │
│                              502                                │
└─────────────────────────────────────────────────────────────────┘
                                │
                                ▼
┌─────────────────────────────────────────────────────────────────┐
│        Change a shape of cover art to result in a playback shape │
│                              504                                │
└─────────────────────────────────────────────────────────────────┘
                                │
                                ▼
┌─────────────────────────────────────────────────────────────────┐
│                       Blur the cover art                        │
│                              506                                │
└─────────────────────────────────────────────────────────────────┘
                                │
                                ▼
┌─────────────────────────────────────────────────────────────────┐
│                      Rotate the playback shape                  │
│                              508                                │
└─────────────────────────────────────────────────────────────────┘
                                │
                                ▼
┌─────────────────────────────────────────────────────────────────┐
│          Display the transformed metadata in the audio content item │
│                              510                                │
└─────────────────────────────────────────────────────────────────┘
                                │
                                ▼
┌─────────────────────────────────────────────────────────────────┐
│       Display a radial progress indicator in the audio content item │
│                              512                                │
└─────────────────────────────────────────────────────────────────┘
```

```
┌─────────────────────────────────────────────────────────────────┐
│ Present an audio content item in a news feed to be displayed on │
│ a screen of a computing device associated with a user            │
│                              552                                 │
└─────────────────────────────────────────────────────────────────┘
                                  │
                                  ▼
┌─────────────────────────────────────────────────────────────────┐
│ Receive an input by the user for scrolling the news feed and    │
│ the audio content item on the screen                             │
│                              554                                 │
└─────────────────────────────────────────────────────────────────┘
                                  │
                                  ▼
┌─────────────────────────────────────────────────────────────────┐
│ Present a pop out player in response to disappearance of the    │
│ audio content item from the screen based on the scrolling        │
│                              556                                 │
└─────────────────────────────────────────────────────────────────┘
                                  │
                                  ▼
┌─────────────────────────────────────────────────────────────────┐
│ Continue to play the audio content after the disappearance of   │
│ the audio content item from the screen                           │
│                              558                                 │
└─────────────────────────────────────────────────────────────────┘
```

FIGURE 5A

SYSTEMS AND METHODS TO OPTIMIZE MUSIC PLAY IN A SCROLLING NEWS FEED

CROSS-REFERENCE TO RELATED APPLICATIONS

This application is a continuation of U.S. patent application Ser. No. 14/977,577, filed on Dec. 21, 2015 and entitled "SYSTEMS AND METHODS TO OPTIMIZE MUSIC PLAY IN A SCROLLING NEWS FEED", which is incorporated herein by reference in its entirety.

FIELD OF THE INVENTION

The present technology relates to the field of content provision. More particularly, the present technology relates to techniques for optimizing access to music in a news feed.

BACKGROUND

Today, people often utilize computing devices for a wide variety of purposes. Users can use their computing devices, for example, to communicate and otherwise interact with other users. Such interactions are increasingly popular over a social network.

Some interactions in a social network may include the sharing of content. Content can be shared in a variety of manners. One example of a technique to share content with a user in a social network is a news feed. The news feed can be a listing of content items (or stories) that are deemed appropriate for presentation to the user. The news feed for the user can include myriad types of content items. Such content items can include, for example, images uploaded by others in the social network of the user, descriptions of activities of connections of the user, articles regarding subject matter of interest to the user, advertisements directed to the user, etc.

Some content items in the news feed require selection by the user to access the content item. Upon selection of such a content item, the user can be navigated to a different resource of the social network or to another domain on the internet in some cases. In other cases, after selecting an option to access a content item, the content item can disappear when the user scrolls the news feed to consume additional content items.

SUMMARY

Various embodiments of the present disclosure can include systems, methods, and non-transitory computer readable media configured to receive metadata for audio content associated with an audio content item for presentation in a news feed to be displayed on a screen of a computing device associated with a user. The metadata is transformed for display in the audio content item. The transformed metadata is displayed in the audio content item.

In an embodiment, the metadata includes cover art for commercial packaging of the audio content and the transforming the metadata includes changing a shape of the cover art to result in a playback shape.

In an embodiment, the transforming the metadata further includes blurring the cover art.

In an embodiment, the transforming the metadata further includes rotating the playback shape.

In an embodiment, a radial progress indicator is displayed in the audio content item.

In an embodiment, a link selectable by the user to obtain the content item from a content source that maintains the content item is displayed in the audio content item.

In an embodiment, a portion of a second audio content item is displayed horizontally adjacent to the audio content item in the news feed, the audio content item and the second audio content item associated with audio content created by a common artist.

In an embodiment, a horizontal gesture of the user is received in relation to the audio content item. An entirety of the second audio content item is presented in response to the horizontal gesture.

In an embodiment, a vertical gesture of the user is received in relation to the audio content item that causes the audio content item to disappear from the screen. A pop out player is displayed in response to the vertical gesture.

In an embodiment, the audio content continues to play for the user after the audio content item disappears from the screen.

In addition, various embodiments of the present disclosure can include systems, methods, and non-transitory computer readable media configured to present an audio content item in a news feed to be displayed on a screen of a computing device associated with a user. An input by the user for scrolling the news feed and the audio content item on the screen is received. A pop out player is presented in response to disappearance of the audio content item from the screen based on the scrolling.

In an embodiment, audio content associated with the audio content item is played for the user before the receiving an input. The audio content continues to play after the disappearance of the audio content item from the screen.

In an embodiment, play of the audio content is ceased in response to a user input applied to the pop out player to stop the play of the audio content.

In an embodiment, the pop out player displays at least one of metadata associated with the audio content item, a play/pause button, and a radial progress indicator.

In an embodiment, the pop out player is displayed in a selected location of the screen while the user scrolls the news feed.

In an embodiment, a dragging gesture applied by the user to the pop out player is received. A position of the pop out player on the screen is moved in response to the dragging gesture.

In an embodiment, a selected location on the screen for removal of the pop out player from the screen is determined.

In an embodiment, appearance of the pop out player is removed from the screen in response to movement of the pop out player to the selected location.

In an embodiment, the selected location is a region in a center of the screen.

In an embodiment, the news feed is scrolled to cause reappearance of the audio content item on the screen. Appearance of the pop out player on the screen is removed in response to the reappearance of the audio content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates a method to present an audio content item in a news feed, according to an embodiment of the present disclosure.

FIG. 5A illustrates a method to present a pop out player in a news feed, according to an embodiment of the present disclosure.

Figure 1:
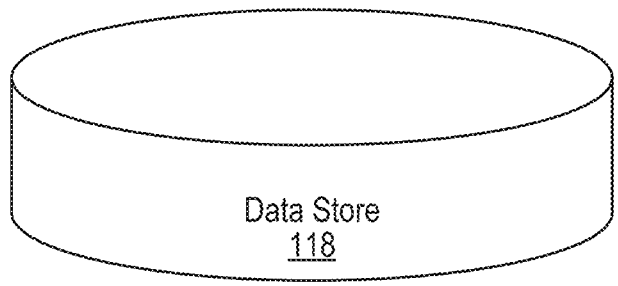
FIG. 1 illustrates a system including an example audio interaction module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Interactions with News Feed to Access Music

A news feed can be an effective technique to present content items (or stories) to a user. In some instances, a news feed can constitute an ordered listing of content items presented for the user to stay apprised of events in his or her social network. The news feed for the user can include various types of content items. The content items can include, for example, images uploaded by others in a social network of the user, accounts of activities of connections of the user, articles regarding subject matter of interest to the user, advertisements directed to the user, etc. Some content items in the news feed require selection of an option by the user to access content associated with the content item. In some cases, after selecting an option to access the content, the content item can disappear when the user scrolls the news feed to view additional content items. In other cases, the user can be navigated to a different resource of the social network or to another domain on the internet.

Conventional interactions with content items in a news feed in this manner are disadvantageous. For example, when the user is accessing audio content associated with a content item presented in the news feed and subsequently wishes to browse other content items in the news feed, the user can scroll away from the content item. However, after scrolling away from the content item, the user can lose the ability to enjoy continued access to or control of the audio content. As another example, when access to content, such as audio content, associated with the content item is selected by the user, the user is often taken away from the news feed upon such selection. The user can be taken away to another resource of a social networking system that supports the news feed or to another domain operated by a third party. In either event, the news feed session can be abruptly interrupted or terminated. As a result, the user is impeded in accessing other relevant content items in the news feed.

An improved approach rooted in computer technology to manage interactions with content items in a news feed in connection with a social networking system overcomes these and other disadvantages associated with conventional approaches implemented in computer technology. Systems, methods, and computer readable media of the present technology can optimize playback of audio content and presentation of associated audio content items that appear in a news feed displayed on a screen of a computing device associated with a user. Content items, including audio content items, can be determined by a news feed algorithm to select items having the most relevance to a user. Audio content items can be associated with music, as one example. Cover art for commercial packaging or marketing of the audio content (e.g., an album) can be obtained. The cover art can be transformed from an first original shape (e.g., rectangular) into a second playback shape (e.g., circular or annular). The audio content item can display the playback shape with a play/pause (or play/stop) button when the audio content item is presented in the news feed. The audio content item also can display a variety of other information about the audio content, such as a title of the audio content, a name of the creator (or artist, performer, or musician), a time length (duration) of the audio content, and availability of the audio content for download or purchase from a content source. When the play/pause button is selected, a portion or entirety of the audio content can be played to the user. While the audio content is playing, the playback shape can spin and a radial progress indicator can indicate the extent to which the audio content has played. In some instances, the application of touch by the user to the radial progress indicator can allow the user to access the audio content at desired positions in the time length of the audio content. If a user swipes to the left in relation to the audio content item, another related audio content item (or any number of additional content items) may appear for playback. In this case, the two audio content items can be associated with one story that contains the two audio content items. The related audio content item, for example, can be associated with other audio content created by the same creator. If a user swipes up or down in relation to the audio content item after the user has selected the play/pause button to play the audio content, a pop out player may appear when the audio content item is no longer viewable. The news feed can be scrolled up or down without interrupting the playback of the audio content. To cease display of the pop out player, the user can drag the pop out player to a selected portion of the displayed news feed. More details regarding the present technology are discussed herein.

FIG. 1 illustrates an example system 100 including an example audio interaction module 102 configured to allow optimized interaction with content items associated with audio content, or audio content items, in a news feed supported by a social networking system, according to an embodiment of the present disclosure. In some embodiments, audio content items can be associated with music. In other embodiments, audio content items can be associated with any other types of audio content. The audio interaction module 102 can include a news feed interface module 104, a user interaction module 106, and a source interface module 108. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the audio interaction module 102 can be implemented in any suitable combinations.

The news feed interface module 104 can communicate with a news feed algorithm that determines relevant content items for presentation in news feeds of users of a social networking system. The content items can include content items that constitute sharing of audio content, for example, by users who consumed the audio content or creators themselves who created the audio content. In one implementation, the news feed algorithm can train (and retrain) machine learning models for ranking content items for potential presentation in news feeds of users. For example, the news feed algorithm can divide its users into different sets based on various attributes of the users (e.g., age, ethnicity, income, language, etc.) and can generate one or more models for each set of users. Users with different attributes may have different behavioral patterns that can reflect their interests in different topics reflected by content items. As a result, different models for ranking content items for different sets of users can provide more accurate ranking of content items and provide higher likelihood that users will be interested in the topics reflected by the content items presented to them.

In accordance with the news feed algorithm, features used to train the models can include interactions of users with content items of a news feed. Such interactions can include, for example, selecting a link in the content item, commenting on the content item, liking the content item, and hiding the content item. The news feed algorithm can use the models for each set of users to determine levels of interest of a user in topics reflected by content items. The level of interest of a user in each topic can be indicated by a topic score. The social networking system can rank a content item for potential presentation to a user based on a topic(s) reflected by the content item and the topic score(s) of the user for the topic(s). In some instances, an aggregate score can be determined for the user in connection with each content item overall, and the content items can be ranked based on their aggregate scores. Content items having a ranking that satisfies a selected threshold value can be ultimately presented to the user in his or her news feed.

The news feed interface module 104 can identify audio content items from the content items selected for ultimate presentation in the news feed. The news feed interface module 104 also can obtain metadata associated with the audio content items. In the case of an audio content item associated with music, metadata can include, for example, cover art for commercial packaging or marketing of the music (e.g., an album), a title of the music, a name of the artist (or musician), a time length (duration) of the music, availability of the music for download or purchase from a music source, a URL for obtaining the music, a number of listens of the music, a number of likes of the audio content item, a number of comments on the audio content item, etc. The metadata can vary based on the type of audio content. The metadata can be provided to the user interaction module 106.

The user interaction module 106 can receive metadata about audio content items for presentation in the news feed. The user interaction module 106 can present an audio content item in the news feed based on one or more of the metadata. The user interaction module 106 can receive a selection to play audio content associated with the audio content item and, in response, dynamically present the audio content item during playback. The user interaction module 106 also can provide functionality in response to scrolling performed by the user. A horizontal scroll in relation to the audio content item can cause the user interaction module 106 to present another audio content item related to the original audio content item. A vertical scroll in relation to the audio content item can cause the user interaction module 106 to display a pop out player for the audio content item when the audio content item scrolls out of view in the news feed. The user interaction module 106 can cease display of the pop out player when the pop out player is dragged to a selected portion of a screen displaying the news feed. The user interaction module 106 is discussed in more detail herein.

The source interface module 108 can communicate with the user interaction module 106 to provide access to audio content. An audio content item presented in the news feed can allow a user to obtain future access to audio content associated with the audio content item. In some instances, the audio content item can include a link or other option that can indicate availability to stream, download, purchase, or otherwise obtain future access to the audio content. When a user selects such an option, the source interface module 108 can facilitate the desired access. For example, if the audio content is maintained by a third party content source, the source interface module 108 can communicate with the third party content source to allow the user to obtain access. In some instances, the source interface module 108 can prompt the user to provide credentials with the third party content source and, upon verification of the credentials, can communicate with a computer system of the third party content source to provide access to the audio content. If the user has already provided credentials with the third party content source, the source interface module 108 can dispense with the prompt for credentials. The audio content can be associated with an account of the user with the third party content source or a collection of other audio content of the user maintained by the third party content source. In another example, if the audio content is maintained by a social networking system that operates the news feed, the source interface module 108 can communicate with a data store of the social networking system to provide access to the audio content.

In some embodiments, the audio interaction module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the audio interaction module 102 can be, in part or in whole, implemented as software running on one or more computing devices or systems, such as on a client computing device or a server. For example, the audio interaction module 102 can be implemented as or within a dedicated application (e.g., app), a program, or an applet running on a user computing device or client computing system. In some instances, the audio interaction module 102 can be, in part or in whole, implemented within or configured to operate in conjunction or be integrated with a social networking system (or service), such as a social networking system 630 of FIG. 6. Likewise, in some instances, the audio interaction module 102 can be, in part or in whole, implemented within or configured to operate in conjunction or be integrated with client computing device, such as the user device 610 of FIG. 6. It should be understood that many variations are possible.

The data store 118 can be configured to store and maintain various types of data, such as the data relating to support of and operation of the audio interaction module 102. The data can include metadata associated with audio content items for presentation in the news feed and audio content itself. The metadata maintained by the data store 118 can include, for example, cover art for commercial packaging or marketing of audio content (e.g., an album), a title of the audio content, a name of the creator, a time length (duration) of the audio content, availability of the audio content for download or purchase from a content source, a URL for obtaining the audio content, a number of listens of the audio content, a number of likes of the audio content item, a number of comments on the audio content item, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the audio interaction module 102 can be configured to communicate and/or operate with the data store 118. In some embodiments, the data store 118 can be a cache within a client computing device. In some embodiments, the data store 118 can be a data store of a server system in communication with the client computing device.

Figure 2:
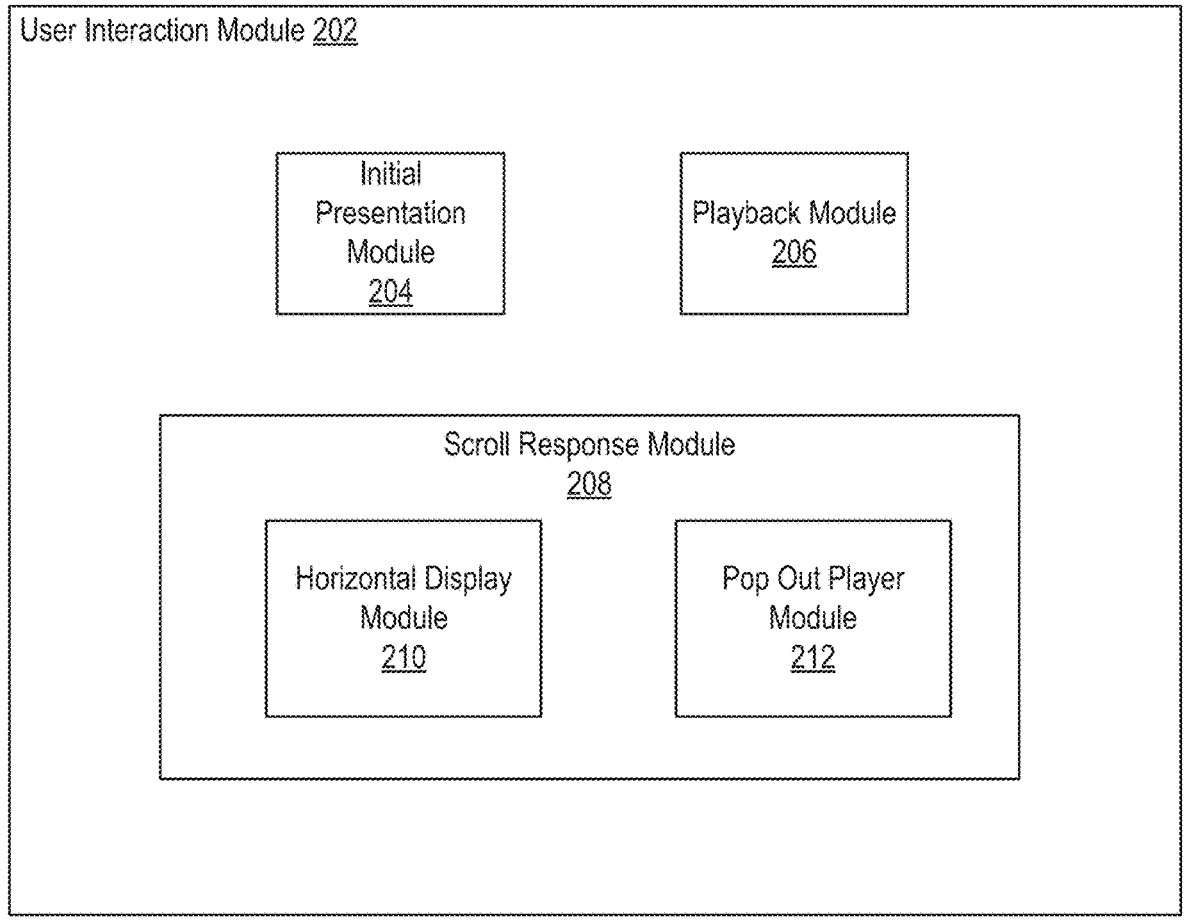
FIG. 2 illustrates an example user interaction module, according to an embodiment of the present disclosure.

FIG. 2 illustrates an example user interaction module 202, according to an embodiment of the present disclosure. In some embodiments, the user interaction module 106 of FIG. 1 can be implemented with the user interaction module 202. As shown in the example of FIG. 2, the user interaction module 202 can include an initial presentation module 204, a playback module 206, and a scroll response module 208. The scroll response module 208 can include a horizontal display module 210 and a pop out player module 212.

The initial presentation module 204 can present the audio content item as the audio content item is first displayed in the news feed. The initial presentation module 204 can design the appearance of the audio content item to reflect some or all of the metadata. For example, the initial presentation module 204 can reflect cover art for commercial packaging or marketing of audio content (e.g., an album), a title of the audio content, a name of the creator (or artist, performer, or musician), a time length (duration) of the audio content, availability of the audio content for download or purchase from an audio content source, a URL for obtaining the audio content, a number of listens of the audio content, a number of likes of the audio content item, a number of comments on the audio content item, and other information. Further, if the audio content was shared by an audio content source on a social networking system, the audio content item can reflect that the audio content "plays from" the audio content source. The initial presentation module 204 also can provide a partial view of another second audio content item related to the audio content item. For example, the audio content item and the second audio content item can be related by being associated with audio content created by a common creator or being included in a common offering (e.g., album).

The initial presentation module 204 can allow the user to interact with the audio content item. The initial presentation module 204 can include a play/pause (or play/stop) button in the audio content item to allow the user to play the entirety or a portion of audio content associated with the audio content item. The initial presentation module 204 also can include a link or other option that, upon selection by the user, can provide the user with later access to audio content associated with the audio content item. The option can provide to the user the capability to stream, download, purchase, or otherwise obtain future access to the audio content.

The playback module 206 can provide the audio content associated with the audio content item and transform the metadata for display in the audio content item. When the play/pause button is selected by the user to play associated audio content, the playback module 206 can play (e.g., stream) audio content for the user to consume. Further, when the play/pause button is selected by the user, the playback module 206 can apply an animation technique to transform the shape of the cover art that initially appeared in the audio content item to a new playback shape or form that appears on a screen. For example, if the cover art was initially presented in the audio content item as a square, the playback module 206 can apply an animation technique to transform the cover art to a new playback shape, such as a disk or annular shape. The playback shape can symbolize a record or CD of the audio content. In some instances, the transformation can include a technique to round the corners of the square or to modify other the portions of the cover art so that they are not cut off or otherwise lost in the transformation to the playback shape. Further, as the cover art is transformed in shape, another transformation can be performed to blur the cover art. The blurring also can be presented as an animation. In one instance, the transformation resulting in a playback shape and the transformation resulting in blurring of the cover art can be presented in one animation that is initiated in response to selection of the play/pause button.

As the audio content is played, in some embodiments, the playback module 206 can perform another animated transformation to cause the playback shape to rotate on the screen. The playback shape can rotate at one or more selected angular velocities. In some instances, the selected angular velocity can have a value that does not exceed a threshold angular velocity so that the blurred cover art is discernible by the user as the playback shape rotates. In other embodiments, the playback module 206 can perform another animated transformation that depicts one or more annular rings symmetrically surrounding a playback shape that appears as a disk on the screen. The playback shape and the annular rings can have a common center, and the animated transformation can depict changes in sizes of the annular rings on the screen by continuously varying their radial values. In some embodiments, the radial values of the annular rings at a particular time during an animation can follow or be in proportion to a decibel level of the audio content at the particular time. When a plurality of annular rings are being animated for presentation at the same time on the screen, the annular rings can have different sizes, and can change sizes at different rates. The annular rings can be depicted to have different colors and shading.

If the play/pause button is selected to stop play of the audio content, the playback module 206 can undo or reverse the transformation of the metadata displayed in the audio content item. The metadata can be displayed in the audio content item as it was displayed before the play/pause button was selected to play the audio content. For example, the shape of the cover art that initially appeared in the audio content item can reappear. As another example, the rotation of the cover art and the playback shape can cease or the appearance of annular rings around the playback shape can cease. As yet another example, the cover art can appear no longer blurred.

The playback module 206 can display a radial progress indicator. The radial progress indicator can indicate the current time position during playback in relation to the entire time length of the audio content. For example, when the radial progress indicator indicates an arc of 90 degrees, one quarter of the entire time length of the audio content has played. As another example, when the radial progress indicator indicates an arc of 180 degrees, one half of the entire length of the audio content has played. In some instances, the playback module 206 can cause the radial progress indicator to appear within the playback shape as it rotates during playback and the playback module 206 can position the play/pause button within the playback shape. The playback module 206 can allow the user to specify where to playback audio content based on an appropriate touch, drag, or other gesture applied to the radial progress indicator to specify a certain time position within the entire time length of the audio content. Upon specification of the time position, the playback module 206 can play the audio content item at the specified time position.

The horizontal display module 210 of the scroll response module 208 can display a second audio content item adjacent to and associated with an audio content item first displayed in the news feed in a horizontal arrangement. In some embodiments, the audio content item and the second audio content item can be associated with audio content that is generated by a common creator. In one example, the audio content item and the second audio content item can be two tracks of an album released by an artist. When a user scrolls, swipes, drags, or otherwise gestures in a horizontal direction in relation to the audio content item, the horizontal display module 210 can display the second audio content item on a screen of a computing device associated with the user. In some embodiments, a portion of the second audio content item can be displayed to the left or right of the audio content item to indicate to the user that the second audio content item is available to be viewed. In some embodiments, user interaction with the second audio content item can be identical or similar to user interaction with the audio content item, as described in more detail herein. Although two related audio content items have been discussed for ease of illustration, any number (e.g., three, ten, twenty, etc.) of related audio content items (e.g., any number of audio content items from an album) can be displayed in this horizontal arrangement. If the user applies a touch gesture to a selected portion of a horizontal arrangement of related audio content items (e.g., audio content items in an album), a full screen version of one or more of the audio content items or the album can be presented on the screen. The full screen version can include a full tracklist of the album so that the user can navigate to, select, and play any playable audio content (e.g., a song) from the album.

The pop out player module 212 of the scroll response module 208 can display a pop out player. The pop out player can be displayed when audio content associated with an audio content items is playing and when the user has scrolled, swiped, dragged, or otherwise gestured in relation to a screen of a computing device associated with the user in a particular direction (e.g., vertical direction, substantially vertical direction) to cause scrolling so that the audio content item no longer appears in the news feed as presented on the screen. If the user has not provided a gesture to a play/pause button to stop playback of the audio content, the audio content can continue to be played even when the audio content item disappears from view on the screen. When the audio content item disappears from view, the pop out player can be presented to allow the user to control playback of the audio content even in the absence of the audio content item.

The pop out player can be displayed to include metadata associated with the audio content item, such as a title of the audio content, an artist of the audio content, an identity of a third party content source to obtain the audio content, etc. Like the audio content item, the pop out player can be displayed to also include a radial progress indicator. The pop out player can include a play/pause button to receive inputs from the user to stop or to play the audio content. The pop out player also can include one or more buttons to allow the user to fast forward, fast backward, move to a next track, and move to a previous track, as desired. For example, if the user desires to stop playing the audio content, the user can provide an appropriate input to the play/pause button of the pop out player.

In some embodiments, if the user gestures to cause scrolling in an opposite direction after disappearance of the audio content item from the screen, the audio content item can reappear on the screen in the news feed. If the user has not pushed a play/pause button to stop playback of the audio content, the audio content can continue to be played as and after the audio content item reappears on the screen. In response to reappearance of the audio content item, the pop out player can disappear from the screen. User interaction with the reappeared audio content item can be as described in more detail herein.

The pop out player module 212 can position the pop out player in a selected location of a screen displaying the news feed. In an embodiment, the selection position of the pop out player on the screen can be chosen based on many considerations, such as minimizing disruption to presentation of content items in the news feed, maximizing user convenience in interacting with the pop out player, etc. In some embodiments, the pop out player can maintain its position while the user scrolls the news feed. For example, the pop out player can be displayed in a lower right hand corner of the screen while the user scrolls the news feed. The pop out player module 212 also can allow the user to drag the pop out player to various positions on the screen, as desired. As the user performs a dragging gesture applied by the user to the pop out player, the pop out player module 212 can cause the position of the pop out player on the screen to follow the movement of the dragging gesture. In some embodiments, the pop out player can be dragged to and docked at a position corresponding to any one of the four corners of a portion of the screen in which content of the news feed is presented. Other positions to dock the pop out player are possible. If the pop out player or a selected portion thereof (apart from play/pause button or a call to action button) is selected by a touch gesture of the user, a full screen version of the audio content item can appear to the user while the associated audio content continues to play, and the pop out player and other content items in the news feed can be removed from the screen. The full screen version can allow the user to interact with the audio content item. In some embodiments, a swipe gesture in a selected direction (e.g., downward) on the audio content item in the full screen version can cause the audio content item to disappear from the screen and the news feed to reappear on the screen, In some instances, the pop out player module 212 can select a location in the screen of the news feed for removal of the pop out player from the screen. For example, the pop out player module 212 can select a region in the center of the screen such that, if the user drags the pop out player to the selected region, the pop out player disappears from view.

Figure 3:
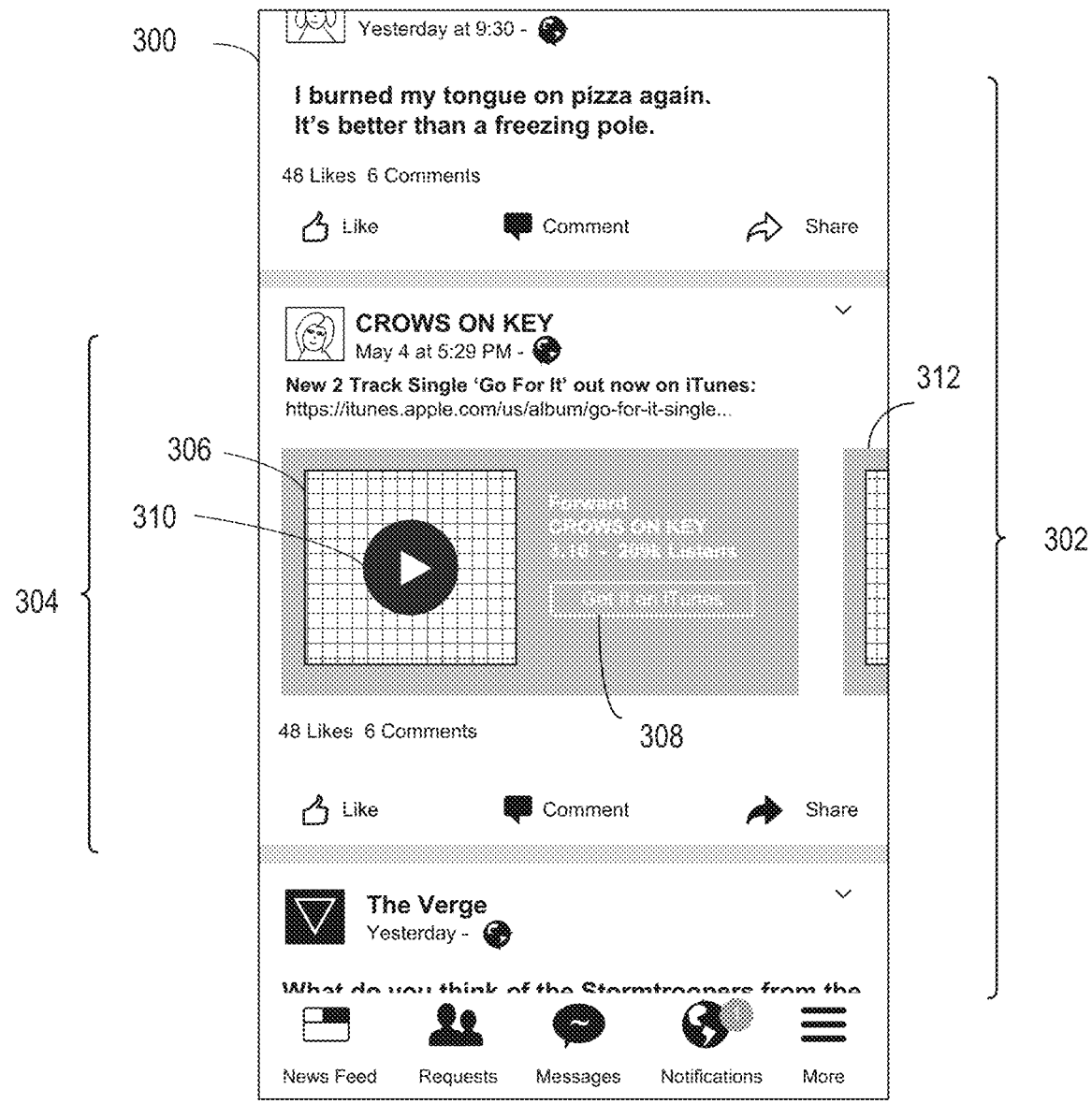
FIG. 3 illustrates a first example of interaction with an audio content item, according to an embodiment of the present disclosure.

FIG. 3 illustrates an example simplified screen 300 of a computing device, such a client computing device, for displaying a news feed 302 for a user of a social networking system, according to an embodiment of the present disclosure. The news feed 302 can include a variety of stories that are displayed. For example, the news feed 302 can include an audio content item 304 that relates to associated audio content that can be played by the user. The audio content item 304 can display a variety of metadata about the associated audio content. In this example, the audio content item 304 can display metadata, such as cover art 306 of the audio content in a particular shaped or pattern. The audio content item 304 also can display information, such as a title of the audio content, an artist who performs the audio content, a time length of the audio content, and a number of times that the audio content has been listened to. The audio content item 304 also can include an option 308 to obtain later access to the audio content through communication with a content source that maintains the audio content. A play/pause button 310 can be selected to playback the audio content.

The news feed 302 includes a second audio content item 312 adjacent to the audio content item 304. A portion of the second audio content item 312 is initially shown in the news feed 302. If the user swipes to the left to scroll horizontally, an entirety of the second audio content item 312 can appear within the screen 300 and the audio content item 304 can disappear from the screen. User interaction with and functionality of the second audio content item 312 can be identical or similar to the audio content item 304.

Figure 3A:
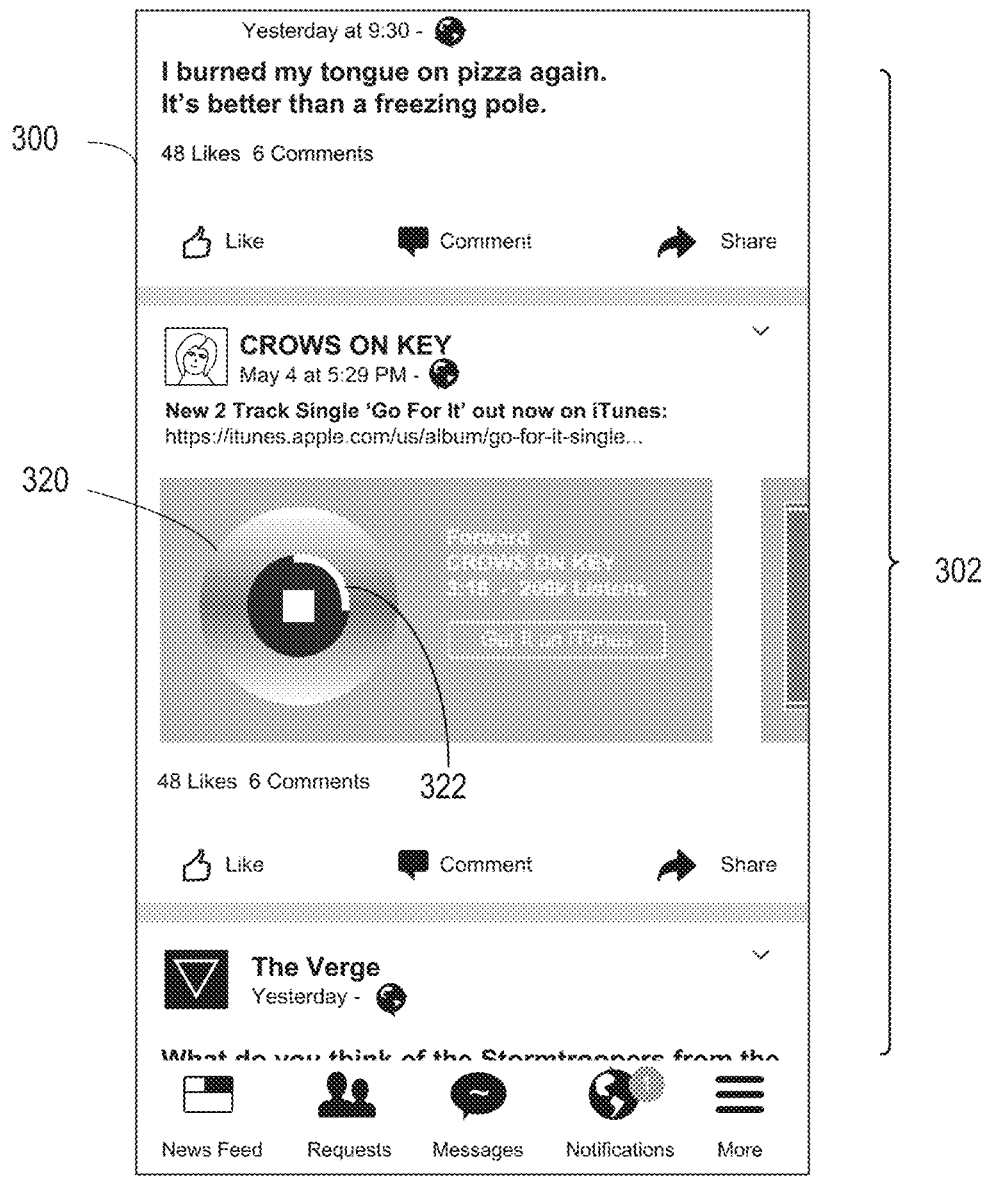
FIG. 3A illustrates a second example of interaction with an audio content item, according to an embodiment of the present disclosure.

FIG. 3A illustrates an example simplified screen 300 of a computing device, such a client computing device, for displaying a news feed 302 for a user of a social networking system as shown in FIG. 3, according to an embodiment of the present disclosure. The example news feed 302 is shown after the user has selected the play/pause button 310 of the audio content item 304, according to an embodiment of the present disclosure. In response to selection of the play/pause button 310, the shape and appearance of the cover art 306 can be transformed by a displayed animation. In particular, the transformation can result in a new playback shape 320 of the depicted cover art and a blurring of the material reflected in the cover art 306. In this example, the cover art 306 was originally shaped in the form of a rectangle and is transformed to have a disk or annular shape. Further, the cover art 306 originally reflected a grid pattern and is transformed to reflect a blurred grid pattern in the playback shape 320.

A radial progress indicator 322 appears within the playback shape 320 to indicate to the user the current time of the playback in relation to the total time length of the audio content. In this example, the radial progress indicator 322 shows an arc of approximately 90 degrees, which indicates that approximately twenty five percent of the audio content has been played. In some embodiments, a gesture applied by the user to the radial progress indicator 322 along a circle traversable by the radial progress indicator 322 can cause the audio content to be played at the position of the gesture. For example, if the user touches a portion of the circle at approximately 270 degrees, the audio content can be played at a position that is approximately seventy five percent into the time length of the audio content.

Figure 4:
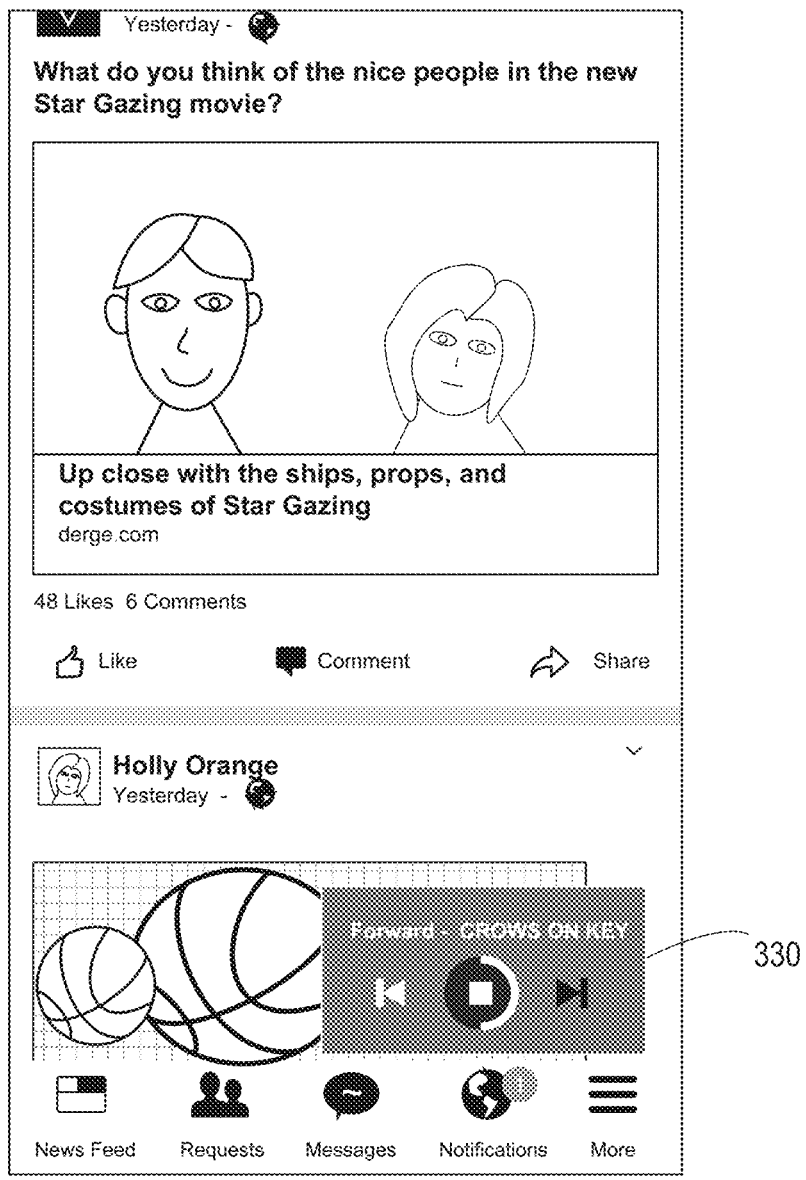
FIG. 4 illustrates a third example of interaction with an audio content item, according to an embodiment of the present disclosure.

FIG. 4 illustrates the example news feed 302 after the user has scrolled so that the audio content item 304 has disappeared from the screen 300, according to an embodiment of the present disclosure. If the user swipes up or down to scroll vertically so that the audio content item 304 no longer appears in the screen 300, a pop out player 330 can appear.

The pop out player 330 can appear to allow the user to control playback of the audio content associated with the audio content item 304 even though the audio content item 304 is no longer in view. When the user swipes up or down to scroll vertically so that the audio content item 304 no longer appears in the screen 300, the audio content that was originally playing when the audio content item 304 was in view on the screen 300 can continue to play. In some embodiments, the user can drag the pop out player 330 to a desired location on the screen 300. In some embodiments, when the user drags the pop out player 330 to a predetermined location on the screen 300, the pop out player 330 can disappear from view.

FIG. 5 illustrates an example method 500 for presentation of an audio content item presented in a news feed of a social networking system, according to an embodiment of the present disclosure. It should be appreciated that there can be additional, fewer, or alternative steps performed in similar or alternative orders, or in parallel, in accordance with the various embodiments and features discussed herein unless otherwise stated.

At block 502, the method 500 can receive metadata for audio content associated with an audio content item for presentation in a news feed to be displayed on a screen of a computing device associated with a user. The metadata can be transformed in a variety of manners for display in the audio content item. At block 504, the method 500 can change a shape of cover art to result in a playback shape. At block 506, the method 500 can blur the cover art. At block 508, the method 500 can rotate the playback shape. At block 510, the method 500 can display the transformed metadata in the audio content item. At block 512, the method 500 can display a radial progress indicator in the audio content item. Other suitable techniques that incorporate various features and embodiments of the present disclosure are possible.

FIG. 5A illustrates an example method 550 for presentation of a pop out player presented in a news feed of a social networking system, according to an embodiment of the present disclosure. It should be appreciated that there can be additional, fewer, or alternative steps performed in similar or alternative orders, or in parallel, in accordance with the various embodiments and features discussed herein unless otherwise stated.

At block 552, the method 550 can present an audio content item in a news feed to be displayed on a screen of a computing device associated with a use. At block 554, the method 550 can receive an input by the user for scrolling the news feed and the audio content item on the screen. At block 556, the method 550 can present a pop out player in response to disappearance of the audio content item from the screen based on the scrolling. At block 558, the method 550 can continue to play the audio content after the disappearance of the audio content item from the screen. Other suitable techniques that incorporate various features and embodiments of the present disclosure are possible.

Social Networking System—Example Implementation

Figure 6:
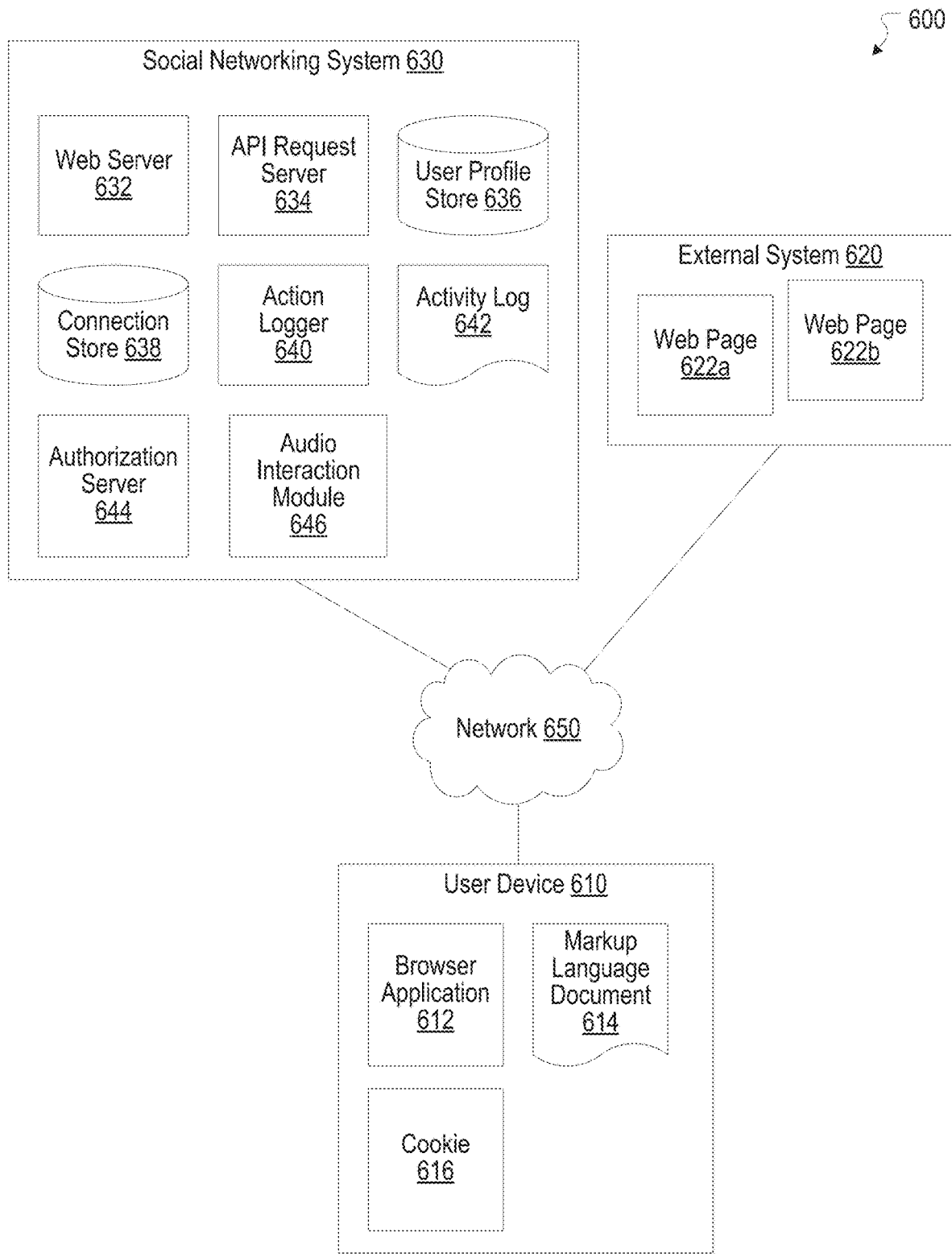
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a audio interaction module 646. The audio interaction module 646 can be implemented with the audio interaction module 102, as discussed in more detail herein. In some embodiments, one or more functionalities of the audio interaction module 646 can be implemented in the user device 610.

Hardware Implementation

Figure 7:
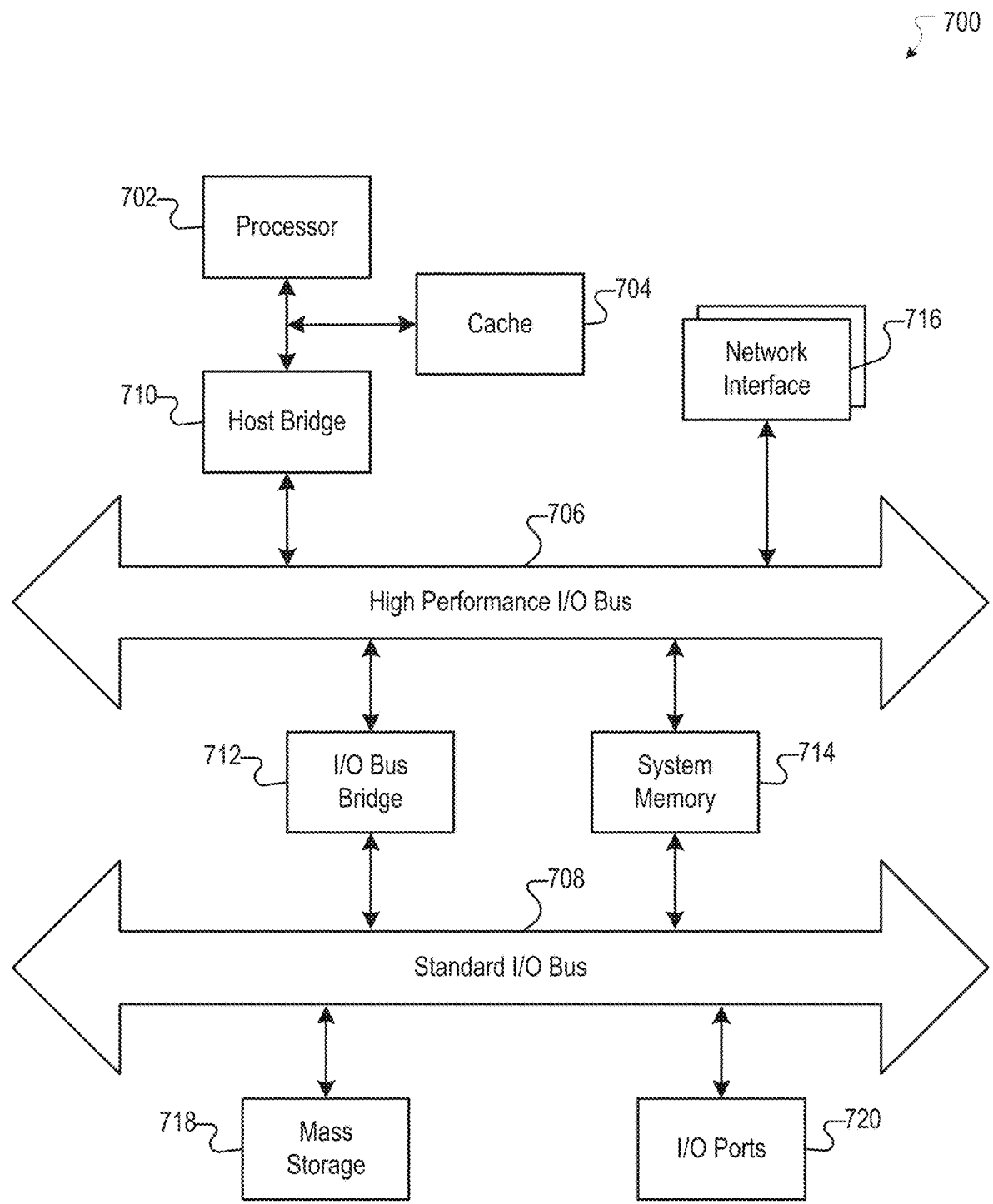
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
providing, by a computing system, a content item associated with cover art for presentation on a screen of a computing device associated with a user, wherein the cover art is associated with an original shape;
providing, by the computing system, a playback shape associated with the cover art in response to a first selection of a button to play or pause the content item, wherein the playback shape is generated based on a transformation of the original shape of the cover art in its entirety;
causing, by the computing system, the playback shape associated with the cover art to rotate while the content item is played through the computing device; and causing, by the computing system, a transformation of the playback shape to the original shape in response to a second selection of the button to play or pause the content item.

2. The computer-implemented method of claim 1, further comprising:
generating, by the computing system, a radial progress indicator indicating a current time position during playback in relation to an entire time length of the content item.

3. The computer-implemented method of claim 2, wherein a specified time position in relation to the entire time length of the content item is selectable based on a gesture applied to the radial progress indicator.

4. The computer-implemented method of claim 1, further comprising:
generating, by the computing system, one or more annular rings symmetrically surrounding the rotating playback shape having a common center, wherein radial values associated with the annular rings at a particular time are in proportion to an audio level of the content item at the particular time.

5. The computer-implemented method of claim 4, wherein each of the annular rings changes in size.

6. The computer-implemented method of claim 1, wherein the original shape corresponds to a rectangular shape, and wherein the playback shape corresponds to a disc.

7. The computer-implemented method of claim 1, wherein the rotating playback shape is rotated during playback of the content item and ceases to be rotated when the playback of the content item is paused or stopped.

8. The computer-implemented method of claim 1, wherein material reflected in the cover art in the rotating playback shape is blurred in the transformation of the cover art.

9. The computer-implemented method of claim 1, wherein the rotating playback shape is rotated at an angular velocity that does not exceed a threshold angular velocity.

10. The computer-implemented method of claim 1, further comprising:
providing, by the computing system, a second content item associated with a creator of the content item in response to a horizontal swipe gesture applied to the rotating playback shape associated with the content item.

11. A system comprising:
at least one processor; and
a memory storing instructions that, when executed by the at least one processor, cause the system to perform:
providing a content item associated with cover art for presentation on a screen of a computing device associated with a user, wherein the cover art is associated with an original shape;
providing a playback shape associated with the cover art in response to a first selection of a button to play or pause the content item, wherein the playback shape is generated based on a transformation of the original shape of the cover art in its entirety;
causing the playback shape associated with the cover art to rotate while the content item is played through the computing device; and
causing a transformation of the playback shape to the original shape in response to a second selection of the button to play or pause the content item.

12. The system of claim 11, wherein the instructions further cause the system to perform:
generating a radial progress indicator indicating a current time position during playback in relation to an entire time length of the content item.

13. The system of claim 12, wherein a specified time position in relation to the entire time length of the content item is selectable based on a gesture applied to the radial progress indicator.

14. The system of claim 11, wherein the instructions further cause the system to perform:
generating one or more annular rings symmetrically surrounding the rotating playback shape having a common center, wherein radial values associated with the annular rings at a particular time are in proportion to an audio level of the content item at the particular time.

15. The system of claim 14, wherein each of the annular rings changes in size.

16. A non-transitory computer-readable storage medium including instructions that, when executed by at least one processor of a computing system, cause the computing system to perform a method comprising:
providing a content item associated with cover art for presentation on a screen of a computing device associated with a user, wherein the cover art is associated with an original shape;
providing a playback shape associated with the cover art in response to a first selection of a button to play or pause the content item, wherein the playback shape is generated based on a transformation of the original shape of the cover art in its entirety;
causing the playback shape associated with the cover art to rotate while the content item is played through the computing device; and
causing a transformation of the playback shape to the original shape in response to a second selection of the button to play or pause the content item.

17. The non-transitory computer-readable storage medium of claim 16, wherein the instructions, when executed, further cause the computing system to perform:
generating a radial progress indicator indicating a current time position during playback in relation to an entire time length of the content item.

18. The non-transitory computer-readable storage medium of claim 17, wherein a specified time position in relation to the entire time length of the content item is selectable based on a gesture applied to the radial progress indicator.

19. The non-transitory computer-readable storage medium of claim 16, wherein the instructions, when executed, further cause the computing system to perform:
generating one or more annular rings symmetrically surrounding the rotating playback shape having a common center, wherein radial values associated with the annular rings at a particular time are in proportion to an audio level of the content item at the particular time.

20. The non-transitory computer-readable storage medium of claim 19, wherein each of the annular rings changes in size.

* * * * *